(12) United States Patent
Azamfar (10) Patent No.: US 10,276,066 B2
(45) Date of Patent: Apr. 30, 2019

(54) REFRESHABLE BRAILLE DISPLAY DEVICE

(71) Applicant: Moslem Azamfar, Semirom (IR)

(72) Inventor: Moslem Azamfar, Semirom (IR)

( * ) Notice: Subject to any disclaimer, the term of this patent is extended or adjusted under 35 U.S.C. 154(b) by 206 days.

(21) Appl. No.: 15/253,627

(22) Filed: Aug. 31, 2016

(65) Prior Publication Data

US 2017/0193856 A1 Jul. 6, 2017

(30) Foreign Application Priority Data

Jan. 2, 2016 (IR) .................. 139450140003011192

(51) Int. Cl.
G09B 21/00 (2006.01)
(52) U.S. Cl.
CPC .................. G09B 21/004 (2013.01)
(58) Field of Classification Search
CPC .... G09B 21/00; G09B 21/001; G09B 21/003; G09B 21/004
USPC .......................................... 434/112, 113, 114
See application file for complete search history.

(56) References Cited

U.S. PATENT DOCUMENTS

| 1,998,063 | A | * | 4/1935 | Wessborg | .................. | B41J 3/32 |
| | | | | | | 101/18 |
| 2,371,325 | A | * | 3/1945 | Wessborg | ............ | G09B 21/003 |
| | | | | | | 116/DIG. 17 |
| 3,659,354 | A | | 5/1972 | Sutherland | | |
| 4,500,293 | A | * | 2/1985 | Eltgen | .................. | G09B 21/003 |
| | | | | | | 340/407.1 |
| 6,354,839 | B1 | | 3/2002 | Schmidt et al. | | |
| 6,639,510 | B1 | * | 10/2003 | Soulie | .................. | G06F 3/0219 |
| | | | | | | 340/407.1 |
| 6,776,619 | B1 | * | 8/2004 | Roberts | ............... | G09B 21/001 |
| | | | | | | 340/4.12 |
| 7,744,372 | B1 | | 6/2010 | Minnich et al. | | |
| 8,133,055 | B2 | * | 3/2012 | Minnich | ................ | G09B 21/02 |
| | | | | | | 434/113 |
| 8,740,618 | B2 | | 6/2014 | Shaw | | |
| 9,105,198 | B2 | | 8/2015 | Habas | | |
| 2002/0045151 | A1 | * | 4/2002 | Roberts | ............... | G09B 21/001 |
| | | | | | | 434/113 |
| 2005/0079472 | A1 | | 4/2005 | Shimamura et al. | | |
| 2009/0220923 | A1 | * | 9/2009 | Smith | .................. | G09B 21/003 |
| | | | | | | 434/113 |
| 2013/0203022 | A1 | * | 8/2013 | Al-Qudsi | ............. | G09B 21/004 |
| | | | | | | 434/113 |

* cited by examiner

*Primary Examiner* — Samchuan C Yao
*Assistant Examiner* — Joshua S Luo (57) ABSTRACT

A refreshable Braille display device comprising a rotatable shaft a plurality of pairs of polygonal discs that selectively rotate about the shaft. Each disc comprises a plurality of outer edge surfaces, each of which comprising a plurality of cell elements fixedly disposed thereon wherein, the cell elements comprise pins, depressions, or a combination of both. The cell elements of two aligned outer surfaces of a pair of discs form a character cell representative of a Braille character. An outer surface is rotatable between one readable position and a plurality of non-readable positions wherein, a Braille character is accessible when the aligned outer surfaces are in the readable position. The device further comprises a converter module for converting text to output Braille and an order module for assigning a target outer surface to each disc in accordance with the output Braille.

1 Claim, 8 Drawing Sheets

TABLE

| OUTER SURFACE | CELL ELEMENT PATTERN |
|---|---|
| S1 | ● ● ● |
| S2 | ● ○ ● |
| S3 | ○ ● ● |
| S4 | ○ ○ ● |
| S5 | ○ ○ ○ |
| S6 | ● ○ ○ |
| S7 | ○ ● ○ |
| S8 | ● ● ○ |

FIG. 11

REFRESHABLE BRAILLE DISPLAY DEVICE

BACKGROUND

For many years, the blind and vision impaired have relied on Braille as a means to read. Today, refreshable Braille displays are available in the art that help them to better communicate with their environment. More particularly, refreshable Braille display devices that enable computers to convert digital text to Braille empower Braille users to use the Internet.

The refreshable Braille displays known in the art (such as U.S. Pat. Nos. 5,453,012 and 5,766,014) normally accommodate 20 to 80 characters at a time. Each character is represented by pins, depressions, or a combination of both, the sum total of which not exceeding 6 or 8. More particularly, a pin comprises an elevated pin, whereas a depression comprises a retracted pin. Therefore, each pin requires an actuator to facilitate the extension and retraction thereof. Thus, each refreshable Braille display requires a minimum of 120 actuators. Aside from high production and maintenance costs as a result of employing too many moving parts, the weight of the machine is significantly increased and the lifetime of the machine is significantly reduced. In addition, if one component malfunctions, the reliability of the Braille device is compromised.

Further, some refreshable Braille displays harnesses piezoelectric principle to extend and retract the pins. Although, the piezoelectric effect is reliable and energy efficient, the cost of each piezoelectric crystal is between $6 to $10 whereby, the final cost of the device runs from $2000 to a whopping $8000. Aside from the aforementioned setbacks of the actuating pin mechanism, another downside with existing technology to help the visually impaired is that a user would have to adapt to a particular type of Braille display.

Finally, the use of software that converts text to sound is one way that enables the vision impaired to access a computer. Unfortunately, the software known in the art encounters problems when converting text in the areas of medicine, engineering, physics and mathematics. Further, individuals that are hearing impaired or hard-of-hearing are unable to use such software.

Considering the above mentioned shortcomings and limitations with the prior art, there is a strong need in the art for a refreshable Braille display that is cheaper, lighter, and more reliable and one that can help the visually impaired live a more successful and fulfilling life.

SUMMARY

The present invention addresses the aforementioned problems with the prior art by teaching a refreshable Braille display device that employs a novel rotating-discs-mechanism wherein, the display of Braille is facilitated by the rotation of polygonal discs.

The device comprises a rotatable hollow shaft and a plurality of pairs of polygonal discs that rotate about shaft. The plurality of pairs of polygonal discs abut one another as each pair of polygonal discs too abut one another. The polygonal disc, more particularly, comprises an octagonal disc comprising a central hole and at least eight planar, outer edge surfaces. In one embodiment, it can be at least eight for a 6 pin Braille character or at least sixteen planar for an 8 pin Braille character. Each outer surface comprises a plurality of cell elements fixedly disposed thereon wherein, the cell elements comprise at least one pin, at least one depression, or a combination of both. The cell elements of two aligned outer surfaces, which pertain to a pair of polygonal discs collectively form a character cell, which is representative of a Braille character.

The device further comprises connecting means, each of which for coupling a polygonal disc to the shaft whereby, the rotary motion of the shaft is imparted to the polygonal disc. Each outer surface, by virtue of the rotation of the polygonal disc, is movable between one horizontal readable position and a plurality of non-readable positions wherein, the readable position is where a user has access to the character cells through his/her sensory route of touch.

The device further comprises a cell database and a processor. The database comprises a plurality of edge entries, each of which representing an outer surface. Each edge entry is associated with a cell entry, which comprises the pattern of cell elements on the corresponding outer surface. The device further comprises a text interface interfacing between a digital text display device (such as, a computer) and the processor. The processor in turn comprises a converter module and an order module. The converter module is disposed in operative communication with the text interface so as to convert the digital text to output Braille. In accordance with the conversion, the order module, which is disposed in operative communication with the cell database orders the target outer surfaces of polygonal discs (ascertained from the cell database) to be moved to the readable position such that, the character cells formed thereby at the readable position represent the output Braille. More particularly, the order module is disposed in operative communication with the step motor and the connecting means thereby controlling the rotation of the shaft and the coupling between the shaft and the polygonal discs.

One aspect of the present disclosure is directed to a refreshable Braille display device comprising: (a) a rotatable shaft; (b) a plurality of pairs of polygonal discs abutting each other, each pair of polygonal discs abutting each other, the rotatable shaft received through the polygonal discs centrally whereby, the polygonal discs rotate about the shaft, each polygonal disc comprising a plurality of planar outer edge surfaces, each of which comprising a plurality of cell elements disposed thereon, the cell elements comprising at least one pin, at least one depression, or a combination of both, the cell elements of two aligned outer surfaces, which pertain to a pair of polygonal discs, form a character cell representative of a Braille character, an outer surface, by virtue of the rotation of the corresponding polygonal disc, rotatable between one readable position and a plurality of non-readable positions, a Braille character accessible to a user for reading through the sensory route of touch upon aligned outer surfaces pertaining to a pair of polygonal discs being at the readable position; (c) connection means, each of which for selectively coupling and decoupling a polygonal disc to the shaft, the rotation of the shaft imparted to a polygonal disc upon the shaft being coupled to the polygonal disc; and (d) a processor comprising: (i) a converter module for converting digital text to output Braille; and (ii) an order module disposed in operative communication with the connection means, the order module for assigning a target outer surface to each polygonal disc in accordance with the output Braille; wherein, the polygonal discs, as enabled by the shaft and the connecting means, are rotated until the target outer surfaces thereof are moved to readable positions whereby, the character cells thus rendered accessible at the readable position are representative of the output Braille.

In one embodiment, the device further comprises a rectangular, horizontal frame comprising a rectangular central opening, the outer surfaces of a pair of polygonal discs being accessible for user reading upon the outer surfaces being accessible within the central opening.

In another embodiment, the device further comprises a stopper extending from a corner of the polygonal disc, the stopper for preventing the rotation of polygonal disc beyond the corner; the corner referred to as the stopper corner. In a related embodiment, due to a proper friction between the shaft and discs—caused by gravitational force, a proper clearance or with some active/passive mechanisms located in the shaft or in discs or both—always discs rotate as the shaft rotates until a stopper stem comes into contact with each disc and hold the disc at its desired position. Notice, in this embodiment, by default, each disc rotates as the shaft rotates, and there would be a temporary or permanent friction between each disk and the shaft. In another embodiment a simple cylindrical shaft with a proper clearance with discs can be used and a simple electromagnet linear actuator would be utilized as a stopper. The stopper comprises: (a) a stopper head that comes into contact with the frame thereby preventing the movement of the corresponding polygonal disc beyond the stopper corner; and (b) a stopper stem extending between the stopper head and the corner. In one embodiment, each polygonal disc is octagonal.

In another embodiment, each outer surface comprises three to four cell elements. In one embodiment, the connecting means comprises an electromagnetic actuator disposed within the shaft. In another embodiment, the shaft is adapted to be rotated in both clockwise and counter-clockwise directions. In one embodiment, the shaft is adapted to be rotated in increments of predefined identical angles; the number of increments equivalent to the number of outer surfaces of a polygonal disc; and wherein upon the shaft being coupled to a polygonal disc, for each increment of the rotation of the shaft, a next edge surface of the polygonal disc is brought to the readable position.

In one embodiment, the shaft is hollow and comprises a longitudinal opening disposed along the length thereof; the longitudinal opening is disposed in communication with the hollow interior; and further wherein the shaft comprises a plurality of pairs of side openings extending from either side of the longitudinal opening, the side openings disposed in communication with the hollow interior; the side openings integral with the longitudinal opening.

In one embodiment, each polygonal disc is octagonal; each outer surface comprises three to four cell elements; the connecting means comprises an electromagnetic actuator disposed within the shaft; the shaft is hollow, driven by a step motor and is adapted to be rotated in both clockwise and counter-clockwise directions. In another embodiment, each polygonal disc further comprises a central hole comprising a plurality of spaced-apart teeth extending towards the center thereof, each number of teeth equivalent to the number of outer surfaces, each tooth pertaining to an outer surface, and wherein a connecting means engages a tooth in order to move the corresponding outer surface to the readable position a connecting means engages a tooth in order to move the corresponding outer surface to the readable position. In yet another embodiment, the polygonal disc further comprises a concentric circular disc abutted thereto, the polygonal disc and the circular disc sharing a common central hole; and wherein the polygonal disc further comprises a spring-loaded friction head pressing against outer circumferential surface of the circular disc; the corresponding polygonal disc, as enabled by the shaft and the connecting means, rotates upon overcoming the frictional resistance imposed by the friction head.

In one embodiment, the shaft is driven by a step motor. In another embodiment, the shaft is adapted to be rotated in increments of predefined identical angles; the number of increments equivalent to the number of outer surfaces of a polygonal disc. In one embodiment, upon the shaft being coupled to a polygonal disc, for each increment of the rotation of the shaft, a next edge surface of the polygonal disc is brought to the readable position. In one embodiment, the shaft is hollow. In a related embodiment, the shaft comprises a longitudinal opening disposed along the length thereof; the longitudinal opening disposed in communication with the hollow interior. In another related embodiment, the shaft comprises a plurality of pairs of side openings extending from either side of the longitudinal opening, the side openings disposed in communication with the hollow interior; the side openings integral with the longitudinal opening.

In one embodiment, each polygonal disc further comprises a central hole comprising a plurality of spaced-apart teeth extending towards the center thereof, each number of teeth equivalent to the number of outer surfaces, each tooth pertaining to an outer surface. In a related embodiment, a connecting means engages a tooth in order to move the corresponding outer surface to the readable position. In one embodiment, the polygonal disc further comprises a concentric circular disc abutted thereto, the polygonal disc and the circular disc sharing a common central hole. In another embodiment, the polygonal disc further comprises a spring-loaded friction head pressing against outer circumferential surface of the circular disc; the corresponding polygonal disc, as enabled by the shaft and the connecting means, rotates upon overcoming the frictional resistance imposed by the friction head.

In one embodiment, the device further comprises a database disposed in operative communication with the order module, the database comprising a plurality of edge entries, each of which representing an outer surface of a polygonal disc, each edge entry associated with a cell entry, which represents the pattern of the cell elements disposed on the corresponding outer surface.

Another aspect of the present disclosure is directed to a refreshable Braille display device comprising: (a) a rotatable shaft; (b) a plurality of pairs of polygonal discs abutting each other, each pair of polygonal discs abutting each other, a rotatable shaft received through the polygonal discs centrally whereby, the polygonal discs rotate about the shaft, each polygonal disc comprising a plurality of planar outer edge surfaces, each of which comprising a plurality of cell elements disposed thereon, the cell elements comprising at least one pin, at least one depression, or a combination of both, the cell elements of two aligned outer surfaces, which pertain to a pair of polygonal discs, form a character cell representative of a Braille character, an outer surface, by virtue of the rotation of the corresponding polygonal disc, rotatable between one readable position and a plurality of non-readable positions, a Braille character accessible to a user for reading through the sensory route of touch upon aligned outer surfaces pertaining to a pair of polygonal discs being at the readable position; (c) a database comprising a plurality of edge entries, each of which representing an outer surface of a polygonal disc, each edge entry associated with a cell entry, which represents the pattern of the cell elements disposed on the corresponding outer surface; (d) connection means, each of which for selectively coupling and decoupling a polygonal disc to the shaft, the rotation of the shaft imparted to a polygonal disc upon the shaft being coupled to the polygonal disc; and (e) a processor comprising: (i) a converter module for converting text to output Braille; and (ii) an order module disposed in operative communication with the connection means and the database, the order module for assigning a target outer surface to each polygonal disc in accordance with the output Braille; wherein, the polygonal discs, as enabled by the shaft and the connecting means, are rotated until the target outer surfaces thereof are at readable positions whereby, the character cells thus rendered accessible are representative of the output Braille.

Another aspect of the present disclosure is directed to a refreshable Braille display device comprising: (a) a rotatable shaft; (b) a plurality of pairs of polygonal discs abutting each other, each pair of polygonal discs abutting each other, the rotatable shaft received through the polygonal discs centrally whereby rotary motion of the shaft is imparted to the polygonal discs, the polygonal discs adapted to be rotated about the shaft upon overcoming the frictional resistance there between, each polygonal disc comprising a plurality of planar outer edge surfaces, each of which comprising a plurality of cell elements disposed thereon, the cell elements comprising at least one pin, at least one depression, or a combination of both, the cell elements of two aligned outer surfaces, which pertain to a pair of polygonal discs, form a character cell representative of a Braille character, an outer surface, about the rotatable shaft, rotably movable between one readable position and a plurality of non-readable positions, a Braille character accessible to a user for reading through the sensory route of touch upon aligned outer surfaces pertaining to a pair of polygonal discs being at the readable position; (c) a plurality of stoppers, each of which pertaining to a polygonal disc, each stopper longitudinally movable between an engagement position, where the stopper engages the corresponding polygonal disc thereby preventing the polygonal disc from further rotation, and a disengagement position, where the stopper disengages the corresponding polygonal disc whereby, the polygonal disc is free to rotate along with the rotation of the shaft; (d) a processor comprising: (i) a converter module for converting digital text to output Braille; (ii) an order module for assigning a target outer surface to each polygonal disc in accordance with the output Braille; and wherein, the polygonal discs, as enabled by the rotatable shaft, are rotated until the target outer surfaces thereof are rotably moved to readable positions at which point, the stoppers engage corresponding polygonal discs preventing the polygonal discs from any further rotation; the character cells thus rendered accessible at the readable position being representative of the output Braille.

In one embodiment, a stopper engages the corresponding polygonal disc at one of the corners thereof. In another embodiment, the stopper comprises: a hollow stopper head; and an elongate stopper stem reciprocating within the stopper head between the engaging the disengaging positions; the stopper stem engaging the corresponding polygonal disc. In one embodiment, the device further comprising a rectangular, horizontal frame comprising a rectangular central opening, the outer surfaces of a pair of polygonal discs being accessible for user reading upon the outer surfaces being accessible for touch within the central opening.

In one embodiment, each polygonal disc comprises at least eight planar outer edge surfaces, and wherein each polygonal disc comprises eight planar outer edge surfaces. In another embodiment, each outer surface comprises three to four cell elements. In one embodiment, the shaft is driven by a step motor and is adapted to be rotated in both clockwise and counter-clockwise directions. In one embodiment, the shaft is adapted to be rotated in increments of predefined identical angles; the number of increments equivalent to the number of outer surfaces of a polygonal disc; and wherein for each increment of the rotation of the shaft, a next edge surface of the polygonal disc is brought to the readable position.

In one embodiment, the frictional resistance between each polygonal disc and the shaft is acquired, using a passive/active actuator disposed within the shaft; wherein the passive actuator comprise a spring-loaded head pressing each polygonal disc to the shaft or a simple permanent magnet attaching each disc to the shaft. In one embodiment, the stopper comprises an electromagnetic actuator. In another embodiment, the device further comprises a database disposed in operative communication with the order module, the database comprising a plurality of edge entries, each of which representing an outer surface of a polygonal disc, each edge entry associated with a cell entry, which represents the pattern of the cell elements arranged on the corresponding outer surface.

The present invention, when compared to the prior art, is simpler, lighter, reliable, and cheaper as the number of moving parts are reduced by 83%. The device of the present invention can display up to 250 words per minute.

Other features and advantages will become apparent from the following description of the preferred embodiments, taken in conjunction with the accompanying drawings.

BRIEF DESCRIPTION OF THE DRAWINGS

Various embodiments of the disclosed system and method are described herein with reference to the accompanying drawings, which form a part of this disclosure, wherein.

FIGURES—REFERENCE NUMERALS

10—Refreshable Braille Display Device
12—Rotatable Shaft
14—Polygonal Disc
14A & 14B—Pair of Polygonal Discs
16—Hollow Interior
18—Longitudinal Opening
20—Side Opening
22—Rectangular Frame
26—Cell Element
28—Central Hole
30—Tooth
32—Circular Disc
34—Spring-loaded Member
36—Spring
38—Spring Stem
40—Friction Head
41—Stopper
42—Stopper Head
44—Stopper Stem
46—Cell Database
48—Digital Text Display Device
50—Text Interface
52—Processor
54—Converter Module
56—Order Module
58—Step Motor
60—Connecting Means
62—Stopper Module

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The present disclosure relates to refreshable Braille display devices and more particularly, to a refreshable Braille display device that employs a novel rotating-discs-mechanism.

Embodiments of the present invention are directed to a Braille display device that employs a novel rotating-discs-mechanism in order to render the display thereof refreshable. The device interfaces with a digital text display device (i.e., a computer) in order to convert digital text to Braille. The device is adapted to be refreshable either at once (i.e., one line after another) or gradually (one Braille character after another) as the reading progresses as sensed by user touch.

Figure 9:
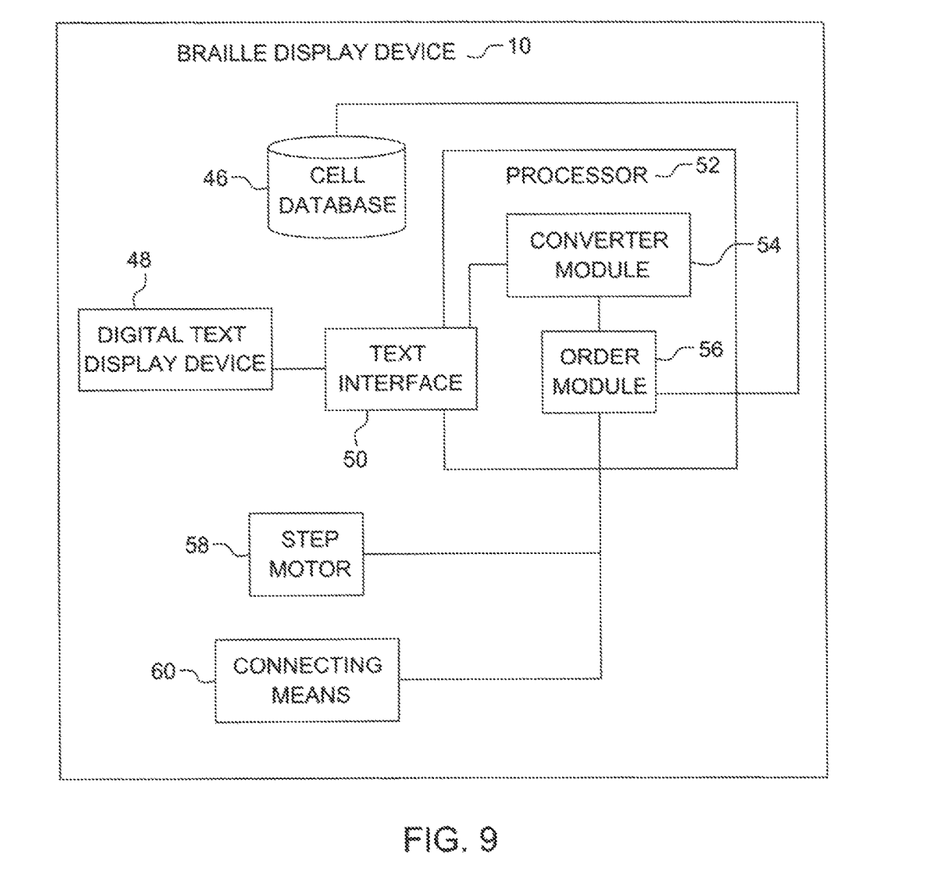
FIG. 9, according to an alternate embodiment of the present invention, is a block diagram of the Braille display device.

Referring to FIGS. 1 through 4, the device 10 comprises a rotatable hollow shaft 12 and a plurality of pairs of polygonal discs 14A and 14B that rotate about shaft 12. The shaft 12 comprises an elongate, rectangular, longitudinal opening 18 disposed along the length thereof wherein, the longitudinal opening 18 is in communication with the hollow interior 16 of the shaft 12. The shaft 12 further comprises a plurality of pairs of opposingly-disposed, rectangular side openings 20 integrally branching out from and extending along the length of the longitudinal opening 18 such that, each side opening 20 is perpendicular to the longitudinal opening 18. The side openings 20 too are disposed in communication with the hollow interior 16 of the shaft 12. The shaft 12 is driven in both clockwise and counter-clockwise directions as enabled by a step motor 58 (FIG. 9), which is preferably powered by a 5-volt DC power supply. In one embodiment, an electromotor and an encoder are employed in lieu of the step motor 58 (FIG. 9).

One aspect of the present disclosure is directed to a refreshable Braille display device comprising: a rotatable shaft; and a plurality of pairs of polygonal discs abutting each other. Each pair of polygonal discs may abut each other, the rotatable shaft may be received through the polygonal discs centrally whereby, the polygonal discs rotate about the shaft. Furthermore, each polygonal disc may comprise a plurality of planar outer edge surfaces, each of which may comprise a plurality of cell elements disposed thereon.

The cell elements may comprise at least one pin, at least one depression, or a combination of both, the cell elements of two aligned outer surfaces, which pertain to a pair of polygonal discs, form a character cell representative of a Braille character, an outer surface, by virtue of the rotation of the corresponding polygonal disc, rotatable between one readable position and a plurality of non-readable positions, a Braille character accessible to a user for reading through the sensory route of touch upon aligned outer surfaces pertaining to a pair of polygonal discs being at the readable position.

The refreshable Braille display device may further comprise a connection means, for selectively coupling and decoupling a polygonal disc to the shaft, the rotation of the shaft imparted to a polygonal disc upon the shaft being coupled to the polygonal disc. The refreshable Braille display device may further comprise a processor comprising: (i) a converter module for converting digital text to output Braille; and (ii) an order module disposed in operative communication with the connection means, the order module for assigning a target outer surface to each polygonal disc in accordance with the output Braille. The polygonal discs, as enabled by the shaft and the connecting means, may be rotated until the target outer surfaces thereof are moved to readable positions whereby, the character cells thus rendered accessible at the readable position are representative of the output Braille.

Referring to FIGS. 1 through 3 and 5 through 7, the plurality of pairs of polygonal discs 14A and 14B abut one another as each pair of polygonal discs 14A and 14B too abut one another. The polygonal disc 14, more particularly, comprises an octagonal disc comprising a central hole 28 and eight planar, outer edge surfaces labeled from S1 to S8. Each outer surface S1 through S8 comprises a plurality of cell elements 26 fixedly disposed thereon. See also, FIG. 11 which contains Table of cell element patterns on outer surfaces S1 to S8. The polygonal disc 14 may comprise eight outer edge surfaces for a 6-pin Braille character or at least sixteen outer edge surfaces for an 8-pin Braille character. More particularly, the cell elements 26 comprise at least one pin, at least one depression, or a combination of both. For example, as can be appreciated from the Table in FIG. 11, the outer surface S1 comprises cell elements 26 consisting of three pins, while the outer surface S4 comprises cell elements 26 consisting of two successive depressions and a pin in that order.

Figure 11:
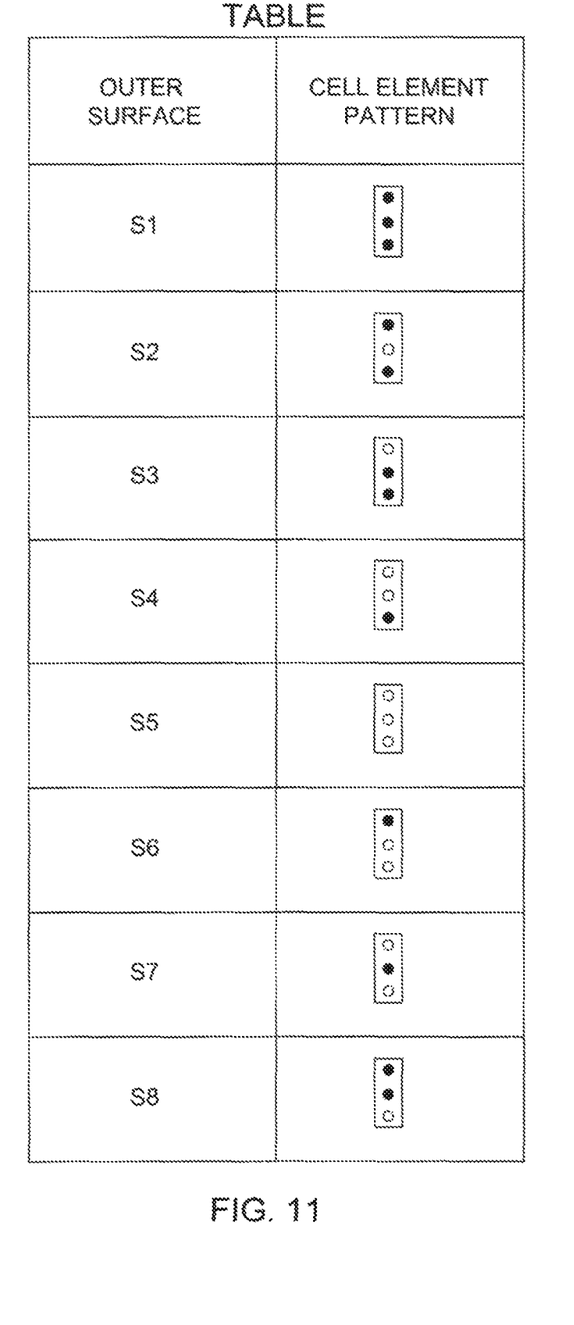
FIG. 11, table of cell element patterns on outer edge surfaces labeled S1 to S8 of polygonal disc The various aspects of the present disclosure mentioned above are described in further detail with reference to the aforementioned figures and the following detailed description of exemplary embodiments.

The cell elements 26 of two aligned outer surfaces S1 through S8, which pertain to a pair of polygonal discs 14A and 14B, collectively form a character cell, which is representative of a Braille character. The polygonal disc 14 further comprises a concentric circular disc 32 attached thereto such that, the polygonal disc 14 and the circular disc 32 share a common central hole 28. The central hole 28 is surrounded by a plurality of spaced-apart teeth 30 extending from the inner circumference of the polygonal disc 14 towards the centre thereof. More particularly, the plurality of teeth 30 comprises eight teeth, each pertaining to an outer surface S1 through S8.

Referring to FIGS. 1 through 7, the device 10 further comprises connecting means 60 (FIG. 9), each of which for coupling a polygonal disc 14 to the shaft 12 whereby, the rotary motion of the shaft 12 is imparted to the polygonal disc 14. More particularly, each connecting means 60 (FIG. 9) comprises an electromagnet disposed within the hollow interior 16 of the shaft 12. The electromagnet is coupled to the corresponding polygonal disc 14 as the electromagnet, via a pair of side openings 20, engage a tooth 30.

As mentioned supra, upon engagement, the rotary motion (clockwise or counter-clockwise) of the shaft 12 is imparted to the polygonal disc 14. Each outer surface S1 through S8, by virtue of the rotation of the polygonal disc 14, is movable between one horizontal readable position and a plurality of non-readable positions wherein, at readable position, as mentioned earlier, two horizontally aligned outer surfaces S1 through S8 bring together the respective cell elements 26 thereof forming a character cell, which is representative of a Braille character.

The shaft 12 and thereby, upon coupling, each polygonal disc 14 are configured to rotate in increments of predefined angles wherein, it takes eight (equivalent to the number of outer surfaces S1 through S8) number of increments to come full circle. More particularly, the shaft 12 is configured to rotate angular increments of 45° wherein, for each rotation of the shaft 12, a next outer surface S1 through S8 is brought up to the readable position. Notably, the readable position is at 0° or 360°. More particularly, engaging a polygonal disc 14 at a target outer surface S1 through S8 (by engaging the corresponding tooth 30) at any angle of the shaft 12 and rotating the polygonal disc to 360° brings the target outer surface S1 through S8 to the readable position.

Figure 1:
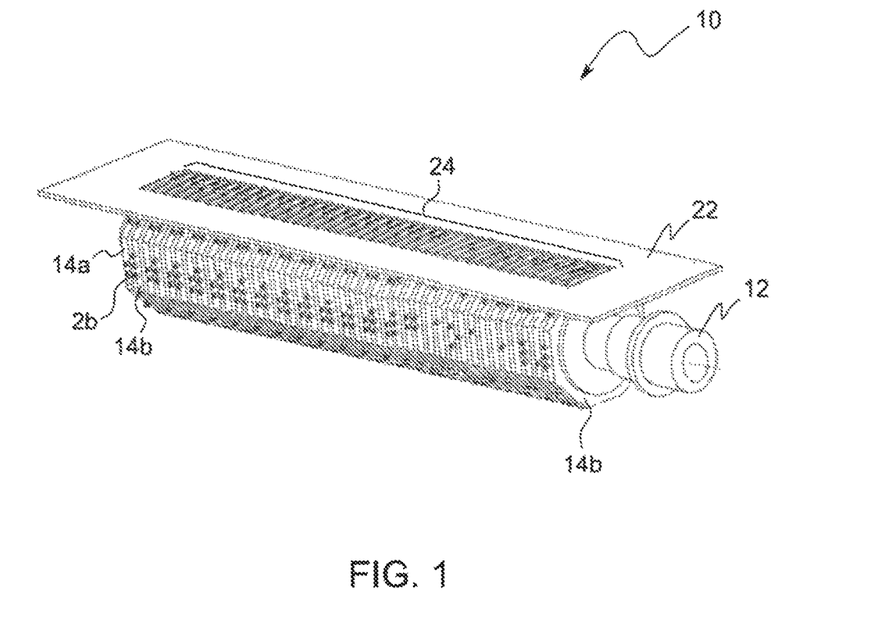
FIG. 1, according to an embodiment of the present invention, is an illustration of a perspective view of the refreshable Braille display device.
Figure 2:
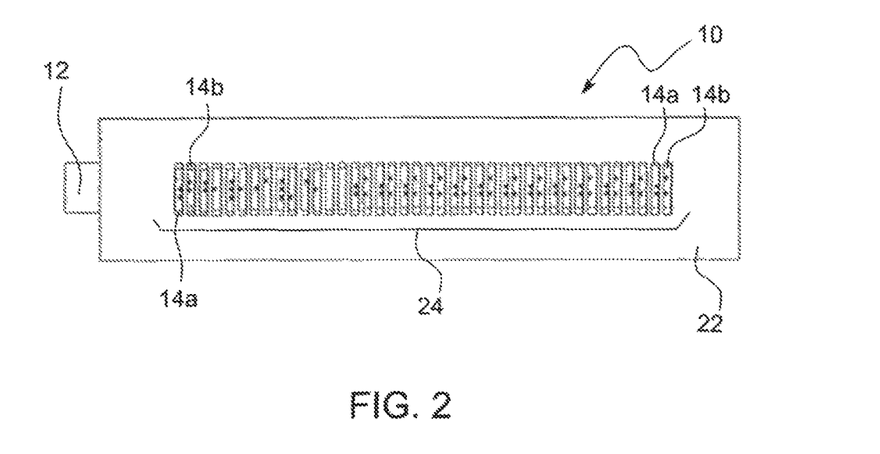
FIG. 2, according to an embodiment of the present invention, is an illustration of a top view of the refreshable Braille display device.
Figure 3:
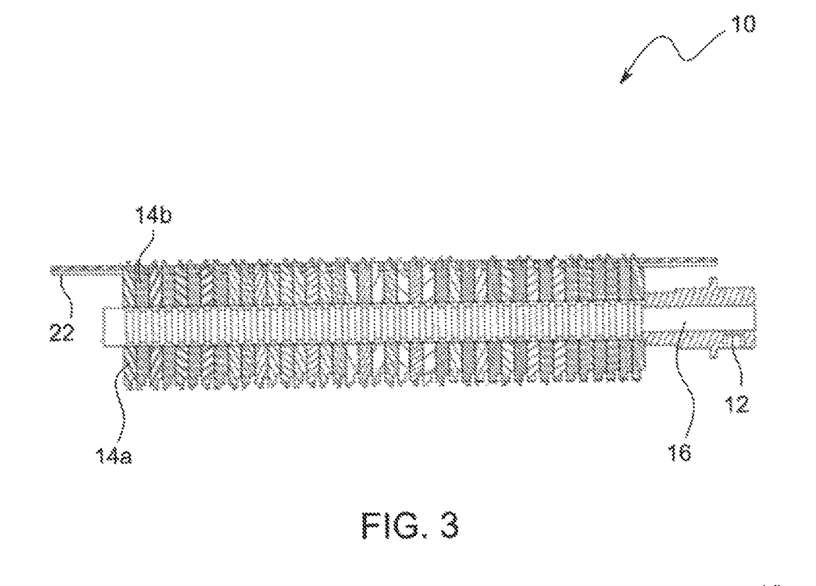
FIG. 3, according to an embodiment of the present invention, is an illustration of a side sectional view of the refreshable Braille display device.
Figure 4:
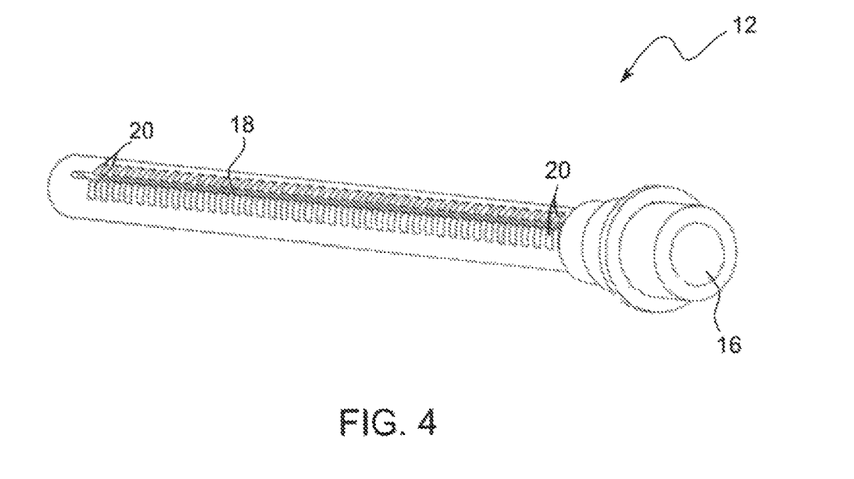
FIG. 4, according to an embodiment of the present invention, is an illustration of a perspective view of the rotatable shaft.

Referring to FIGS. 1 through 3, the device 10 further comprises a rectangular, horizontal frame 22 comprising planar top and bottom surfaces and central rectangular opening 24. The horizontal frame 22 is arranged such that, the outer surfaces S1 through S8 in the readable position lie within the rectangular opening 24 such that, the collective outer surfaces S1 through S8 in the readable position are flush with the planar top surface of the rectangular frame 22. In other words, a user, via his/her sensory route of touch, accesses Braille through the central opening 24 of the rectangular frame 22.

Figure 5:
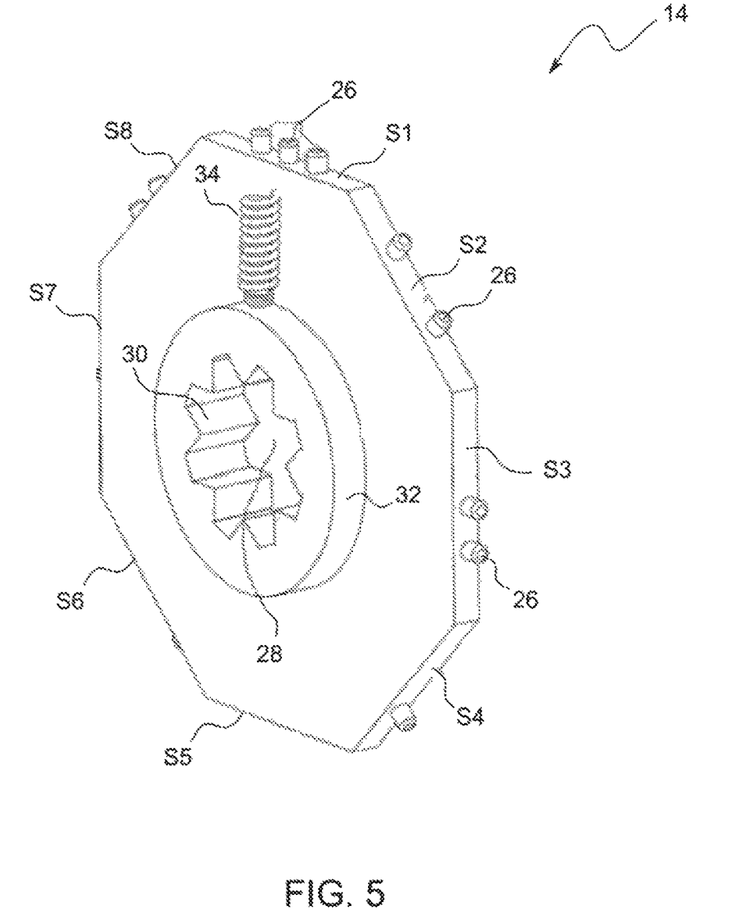
FIG. 5, according to an embodiment of the present invention, is an illustration of a perspective view of the polygonal disc.
Figure 6:
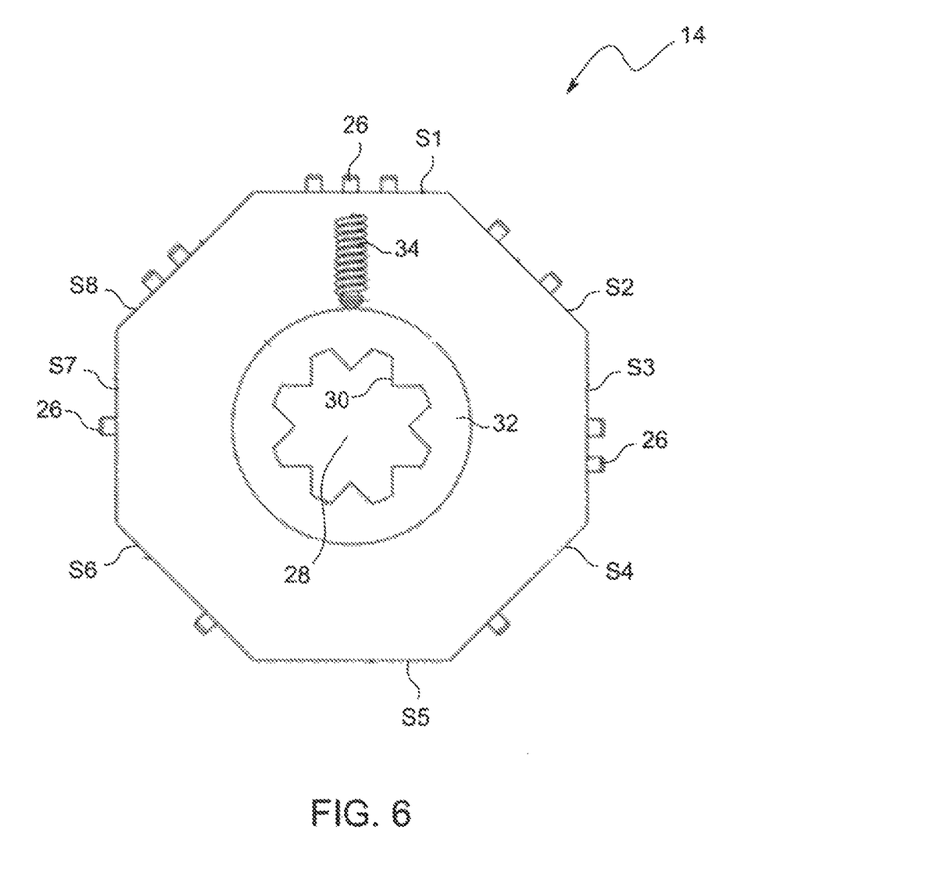
FIG. 6, according to an embodiment of the present invention, is an illustration of a side view of the polygonal disc.
Figure 7:
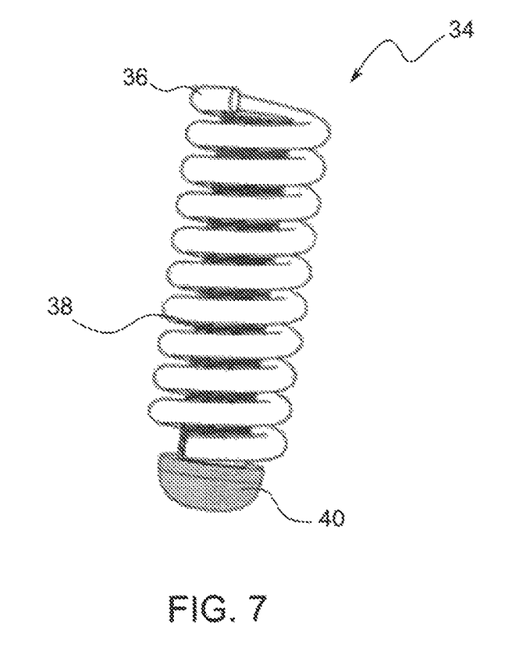
FIG. 7, according to an embodiment of the present invention, is an illustration of a spring-loaded friction head.

Referring to FIGS. 5 through 7, each polygonal disc 14 further comprises a spring-loaded member 34 incorporated therein in order to add positional stability thereto. More particularly, the spring-loaded member 34 comprises an elongate friction member and a spring 36. The friction member comprises an elongate spring stem 38 about which the spring 36 is coiled around and a friction head 40 disposed at an extremity of the spring stem 38. The spring 36 presses the friction head 40 against the outer circumferential surface of the circular disc 32. Therefore, as the polygonal disc 14 is rotated about the shaft 12, the polygonal disc 14 needs to overcome the frictional resistance between the friction head 40 and circumferential surface of the circular disc 32. This ensures that the position of the polygonal discs 14 doesn't change easily unless enabled by the rotation of the shaft 12.

Figure 8:
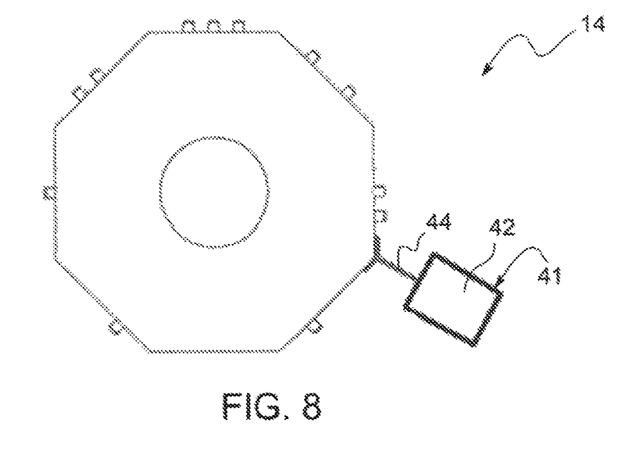
FIG. 8, according to an alternate embodiment of the present invention, is an illustration of a side view of the polygonal disc.

Referring to FIG. 8, in one embodiment, each polygonal disc 14 comprises a stopper for preventing the rotation of the polygonal disc 14 and thereby the shaft 12 beyond a point. The stopper head 42 and a stopper stem 44 extending from one of the eight corners of the polygonal disc 14 and the stopper head 42. Notably, the corner from which the stopper stem 44 extends is referred to as stopper corner.

Referring to FIG. 9, the device 10 further comprises a cell database 46 and a processor 52. The database 46 comprises a plurality of edge entries, each of which representing an outer surface S1 through S8. Each edge entry is associated with a cell entry, which comprises the pattern of cell elements 26 on the corresponding outer surface S1 through S8. The device 10 further comprises a text interface 50 interfacing between the digital text display device 48 (such as, a computer) and the processor 52. The processor 52 in turn comprises a converter module 54 and an order module 56. The converter module 54 is disposed in operative communication with the text interface 50 so as to convert the digital text to output Braille.

In accordance with the conversion, the order module 56, which is disposed in operative communication with the cell database 46 orders the target outer surfaces of polygonal discs 14 (ascertained from the cell database 46) to be moved to the readable position such that, the character cells formed thereby at the readable position represent the output Braille. More particularly, the order module 56 is disposed in operative communication with the step motor 58 and the connecting means 60 thereby controlling the rotation of the shaft 12 and the coupling between the shaft 12 and the polygonal discs 14.

In one embodiment, the shaft 12 and the polygonal discs 14 are coupled to each other by default. The shaft 12 and the polygonal discs 14 become decoupled once the target outer surfaces S1 through S8 reach the readable position. In one embodiment, the information of the angle of rotation of the shaft 12, the information of the engagement of the polygonal discs 14, etc., would be recorded in a history database and retrieved upon demand so that, the conversion and order modules 54 and 56 do not have to process information for each and every word that has been displayed earlier. More particularly, the information of each rotation of the shaft 12 would be either added to or subtracted from the history database. Thus, the position of all polygonal discs 14 is recognized from the history database at all times. This information is recorded and saved to create a history that can be used for recalling previous positions upon demand.

In one embodiment, the rotatable shaft 12 comprises a solid member (as opposed to being a hollow member) and the polygonal discs 14 are received over the shaft 12 such that, the rotation of the shaft 12 is imparted to the polygonal discs 14. More particularly, the rotation of the shaft 12 is imparted to the polygonal discs 14 as a result of gravitational force, a proper clearance, or with some active/passive mechanisms disposed within the shaft 12, or the polygonal discs 14 or both. The shaft 12 rotates within a polygonal disc or discs 14 without imparting the rotary motion thereof to the polygonal disc or discs 14 only upon the shaft 12 and the polygonal discs 14 overcoming the frictional resistance therebetween. In this embodiment, as can be appreciated from FIG. 8, instead of connection means 60, a plurality of stoppers 41 is employed for preventing the rotary movement of the polygonal discs 14 along with that of the shaft 12.

More particularly, referring to FIG. 8, a stopper 41, which comprises an electromagnetic linear actuator, comprises a hollow stopper head 42 and an elongate stopper stem 44 reciprocally disposed within stopper head 42. More particularly, the stopper stem 44 is longitudinally linearly displaceable between an engagement and a disengagement position. While the distal extremity of the stopper stem 44 is disposed within the stopper head 42, the proximal extremity thereof is adapted engage and disengage from the corresponding polygonal disc 14 in the engagement and disengagement positions respectively. More particularly, the stopper stem 44, as can be appreciated from FIG. 8, at the engagement position thereof, is adapted to engage one of the corners of the corresponding polygonal disc 14. Therefore, in this embodiment of the Braille device 10, as a target outer surface of a polygonal disc 14 is brought to the readable position simply by rotation of the shaft, the corresponding stopper 41 engages the polygonal disc 14 thereat thereby preventing the polygonal disc 14 from any further rotation.

Figure 10:
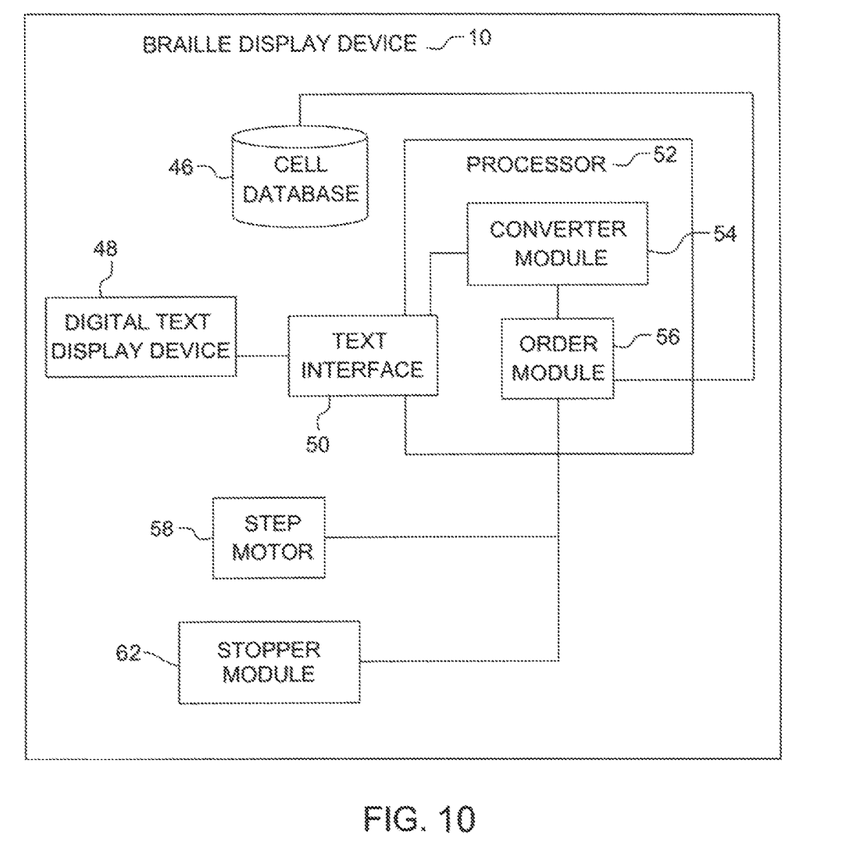
FIG. 10, according to an alternate embodiment of the present invention, is a block diagram of the Braille display device.

Referring to FIG. 10, in this embodiment, the device 10 further comprises a cell database 46 and a processor 52, which are same as those of the preferred embodiment of the device 10. In this embodiment too, the device 10 further comprises a text interface 50 interfacing between the digital text display device 48 and the processor 52. The processor 52 in turn comprises a converter module 54 and an order module 56. The function of the converter module 54 remains virtually unchanged. The order module 56, on the other hand, on account of the device 10 not employing the connection means anymore, only orders the target outer surfaces of polygonal discs 14 to be moved to the readable position as enabled by a step motor 58. At this point, a stopper module 62, which controls the movement of the stoppers, is deployed resulting in the polygonal discs that are rotated to the readable positions being engaged by the corresponding stoppers thereof.

The device may further comprise a rectangular, horizontal frame comprising a rectangular central opening. The outer surfaces of a pair of polygonal discs may be accessible for user reading upon the outer surfaces being accessible within the central opening. The device may further comprise a stopper extending from a corner of the polygonal disc, the stopper for preventing the rotation of polygonal disc beyond the corner; the corner referred to as the stopper corner.

The stopper may comprise (a) a stopper head that comes into contact with the frame thereby preventing the movement of the corresponding polygonal disc beyond the stopper corner; and (b) a stopper stem extending between the stopper head and the corner. Each polygonal disc may be octagonal. Each outer surface may comprise three to four cell elements. In one example, the connecting means may comprise an electromagnet disposed within the shaft.

The shaft may be adapted to be rotated in both clockwise and counter-clockwise directions. The shaft may be driven by a step motor. The shaft may be hollow. The shaft may be adapted to be rotated in increments of predefined identical angles, the number of increments equivalent to the number of outer surfaces of a polygonal disc. Upon the shaft being coupled to a polygonal disc, for each increment of the rotation of the shaft, a next edge surface of the polygonal disc may be brought to the readable position. The shaft may comprise a longitudinal opening disposed along the length thereof. The longitudinal opening may be disposed in communication with the hollow interior. The shaft may comprise a plurality of pairs of side openings extending from either side of the longitudinal opening, the side openings disposed in communication with the hollow interior; the side openings integral with the longitudinal opening.

Each polygonal disc may further comprise a central hole comprising a plurality of spaced-apart teeth extending towards the center thereof, each number of teeth equivalent to the number of outer surfaces, each tooth pertaining to an outer surface. A connecting means may engage a tooth in order to move the corresponding outer surface to the readable position. The polygonal disc may further comprise a concentric circular disc abutted thereto, the polygonal disc and the circular disc sharing a common central hole. The polygonal disc may comprise a spring-loaded friction head pressing against outer circumferential surface of the circular disc; the corresponding polygonal disc, as enabled by the shaft and the connecting means, rotates upon overcoming the frictional resistance imposed by the friction head.

The device may further comprise a database disposed in operative communication with the order module. The database may comprise a plurality of edge entries, each of which may represent an outer surface of a polygonal disc, each edge entry may be associated with a cell entry, which represents the pattern of the cell elements disposed on the corresponding outer surface.

Another aspect of the present disclosure is directed to a refreshable Braille display device comprising: a rotatable shaft; and a plurality of pairs of polygonal discs abutting each other. Each pair of the polygonal discs may be abutting each other. A rotatable shaft may be received through the polygonal discs centrally whereby, the polygonal discs rotate about the shaft. Each polygonal disc may comprise a plurality of planar outer edge surfaces, each of which may comprise a plurality of cell elements disposed thereon.

The cell elements may comprise at least one pin, at least one depression, or a combination of both. The cell elements of two aligned outer surfaces, which pertain to a pair of polygonal discs, form a character cell representative of a Braille character, an outer surface, by virtue of the rotation of the corresponding polygonal disc, rotatable between one readable position and a plurality of non-readable positions. A Braille character may be accessible to a user for reading through the sensory route of touch upon aligned outer surfaces pertaining to a pair of polygonal discs being at the readable position. The refreshable braille display device may further comprise a database comprising a plurality of edge entries, each of which representing an outer surface of a polygonal disc. Each edge entry associated with a cell entry may represent the pattern of the cell elements disposed on the corresponding outer surface.

The refreshable braille display device may further comprise connection means for selectively coupling and decoupling a polygonal disc to the shaft. The rotation of the shaft imparted to a polygonal disc upon the shaft being may be coupled to the polygonal disc. The refreshable braille display device may further comprise a processor comprising: (i) a converter module for converting text to output Braille; and (ii) an order module disposed in operative communication with the connection means and the database. The order module for assigning a target outer surface to each polygonal disc may be in accordance with the output Braille. The polygonal discs, as enabled by the shaft and the connecting means, may be rotated until the target outer surfaces thereof are at readable positions whereby, the character cells thus rendered accessible are representative of the output Braille.

The aforementioned embodiments are able to be implemented, for example, using a machine-readable medium or article which is able to store an instruction or a set of instructions that, if executed by a machine, cause the machine to perform a method and/or operations described herein. Such machine is able to include, for example, any suitable processing platform, computing platform, computing device, processing device, electronic device, electronic system, computing system, processing system, computer, processor, or the like, and is able to be implemented using any suitable combination of hardware and/or software. The machine-readable medium or article is able to include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions is able to include any suitable type of code, for example, source code, compiled code, interpreted code, executable code, static code, dynamic code, or the like, and is able to be implemented using any suitable high-level, low-level, object-oriented, visual, compiled and/or interpreted programming language, e.g., C, C++, Java, BASIC, Pascal, Fortran, Cobol, assembly language, machine code, or the like. Functions, operations, components and/or features described herein with reference to one or more embodiments, is able to be combined with, or is able to be utilized in combination with, one or more other functions, operations, components and/or features described herein with reference to one or more other embodiments, or vice versa.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A refreshable Braille display device comprising:
   (a) a rotatable shaft;
   (b) a plurality of pairs of polygonal discs abutting each other, the rotatable shaft received through the polygonal discs centrally whereby rotary motion of the shaft is imparted to the polygonal discs, the polygonal discs adapted to be rotated about the shaft, each polygonal disc comprising a plurality of planar outer edge surfaces, each of which comprising a plurality of cell elements disposed thereon, the cell elements comprising at least one pin, at least one depression, or a combination of both, the cell elements of two aligned outer surfaces, which pertain to a pair of polygonal discs, form a character cell representative of a Braille character, an outer surface, about the rotatable shaft, rotatably movable between one readable position and a plurality of non-readable positions, a Braille character accessible to a user for reading through the sensory route of touch upon aligned outer surfaces pertaining to a pair of polygonal discs being at the readable position;
   (c) a plurality of stoppers, each of which pertaining to a polygonal disc, each stopper longitudinally movable between an engagement position, where the stopper engages the corresponding polygonal disc thereby preventing the polygonal disc from further rotation, and a disengagement position, where the stopper disengages the corresponding polygonal disc whereby, the polygonal disc is free to rotate along with the rotation of the shaft;
   (d) connection means, each of which for selectively coupling and decoupling a polygonal disc to the shaft, the rotation of the shaft imparted to a polygonal disc upon the shaft being coupled to the polygonal disc;
   (e) wherein a frictional resistance between each polygonal disc and the shaft is acquired, using a passive actuator disposed within the shaft; wherein the passive actuator comprises a simple permanent magnet attaching each disc to the shaft;
   (f) the connection means comprises an electromagnetic actuator disposed within the shaft; the shaft is hollow, driven by a step motor and is adapted to be rotated in both clockwise and counter-clockwise directions; and
   (g) a processor comprising:
      (i) a converter module for converting digital text to output Braille;
      (ii) an order module for assigning a target outer surface to each polygonal disc in accordance with the output Braille; and
   wherein, the polygonal discs, as enabled by the rotatable shaft, are rotated until the target outer surfaces thereof are rotatably moved to readable positions at which point, the stoppers engage corresponding polygonal discs preventing the polygonal discs from any further rotation; the character cells thus rendered accessible at the readable position being representative of the output Braille.

* * * * *